United States Patent Office 3,280,007
Patented Oct. 18, 1966

3,280,007
PROCESS FOR PRODUCING 5-AMINO-4-IMIDAZ-OLE-N-SUCCINOCARBOXAMIDE RIBOSIDE
Einosuke Ohmura, Nishinomiya, Teruji Hemmi, Toyonaka, Ikuo Suhara, Takatsuki, and Fumiko Kusaba, Kyoto, Japan, assignors to Takeda Chemical Industries, Ltd., Osaka, Japan
No Drawing. Filed June 17, 1964, Ser. No. 375,926
Claims priority, application Japan, June 19, 1963, 38/32,224
6 Claims. (Cl. 195—28)

This invention relates to a process for producing 5-amino-4-imidazole-N-succinocarboxamide riboside. More particularly, this invention relates to a process for producing 5-amino-4-imidazole-N-succinocarboxamide riboside on industrial scale by action of microorganisms. (Hereinafter 5-amino-4-imidazole-N-succinocarboxamide riboside is referred to as SAICAR.)

Though it has been known that SAICAR plays an important role as a precursor in biosynthesis of purine nucleotides as well as that SAICAR per se has a cell-activating effect, unsuccessfulness of industrial preparation of SAICAR has hitherto prevented its commercial exploitation. It has now been found by the present inventors unexpectedly that incubation of certain microorganisms belonging to the genus Bacillus can result in accumulation of a large amount of SAICAR in the culture medium, and that thus accumulated SAICAR is easily recoverable from the culture medium. Further study has led the present inventors to that face that the SAICAR-producing microorganisms belonging to the genus Bacillus are mutants requiring for their growth specifically adenine series substance, e.g., adenine, adenosine, adenylic acid, etc. (Hereinafter such mutants as above are collectively referred to as adenine-requiring mutants.) Thus, by the utilization of the adenine-requiring mutants of bacteria belonging to the genus Bacillus, an industrial production of SAICAR has now become possible.

The object of this invention is therefore to provide a method for preparing SAICAR which can efficiently be put into practice on an industrial scale with good yield. Another object of the invention is to provide SAICAR in low cost and sufficiently for practical use. The objects are realized by inoculating SAICAR-producing adenine-requiring mutant of microorganism belonging to the genus Bacillus in a culture medium, incubating said culture medium, and recovering thus accumulated SAICAR from the culture medium.

As the wild type microorganisms belonging to the genus Bacillus, there may be exemplified as follows:

*Bacillus subtilis* Cohn emend Prazmowski
*Bacillus cereus* Frankland et Frankland
*Bacillus pumilus* Gottheil
*Bacillus polymyxa* (Prazmowski) Migula
*Bacillus megaterium* de Bary
*Bacillus firmus* Werner Adenine-requiring mutants employed in this invention are produced by applying a conventional method for producing mutants of microorganisms per se. More concretely stated, these microorganisms belonging to the genus Bacillus are treated with e.g., ultraviolet ray, X-ray, nitrogen mustard, nitrous acid, etc. to obtain a mixture of various kinds of nutrient-requiring mutants of microorganisms belonging to the genus Bacillus. Then the adenine-requiring mutants are separated from a mixture of various kinds of nutrient-requiring mutants. Any of the adenine-requiring mutants, including those which are produced spontaneously can be employed in this invention, so far as they have not lost the ability to produce SAICAR.

Thus obtained adenine-requiring mutant of a microorganism belonging to the genus Bacillus is inoculated on a culture medium and incubated. For the purpose of industrial production, it is in general preferable to use liquid culture medium. Generally, the incubation is carried out either stationarily or in the manner of a submerged process under aeration and/or agitation.

The culture medium should contain adenine source. Desirably it may contain proper assimilable carbon source(s) and digestible nitrogen source(s). As the assimilable carbon source, one or more of starch, dextrin, sucrose, lactose, maltose, glucose, glycerol, etc. may be used, and various organic compounds or organic materials such as organic ammonium salts, organic nitrates, urea, various amino acids, cornsteep liquor, peptone, casein, may be used not only as carbon source but also as digestible nitrogen source in the same way as the use of inorganic nitrogen sources, for example, inorganic ammonium salts such as ammonium sulfate, ammonium carbonate, ammonium phosphate, or various kinds of nitrates such as sodium nitrate, potassium nitrate, etc. In addition to these, vitamins, growth factors may be used for the culture medium as accessary nutrients, if necessary.

As the adenine source, there may be employed adenine series compound, e.g., adenine, adenosine, adenylic acid, etc., and substances containing such as adenine series compound, e.g., meat extract, yeast extract, hydrolyzate of nucleic acid, etc.

Adenine source should be added to the culture medium in an sufficient amount for the growth of the adenine-requiring mutant of the microorganism belonging to the genus Bacillus. Though the sufficient amount may vary with the kind of species of microorganisms, etc., an addition 0.1–1000 gamma/milliliter, when calculated in terms of adenine relative to the culture medium, gives a preferable effect in general.

The pH of the medium, incubation temperature and other conditions of incubation are variable depending on the kind of species of adenine-requiring mutant, components or concentration of the culture medium, etc., and these conditions should be controlled so as to have SAICAR accumulated in the maximum amount.

Generally, the initial pH of the culture medium is preferably adjusted within the range between slightly acid and slightly alkaline, and the temperature for incubation is in most cases from 20 to 37°.

Under the above-mentioned culture conditions SAICAR is produced and accumulated in the culture medium with the lapse of time. Depending on the kind of species of adenine-requiring mutant, 5-amino-4-imidazole - N - succinocarboxamide ribotide may be accumulated in the culture medium together with SAICAR. If necessary, thus accumulated 5-amino-4-imidazole-N-succinocarboxamide ribotide may be converted into SAICAR by the action of phosphatase, etc.

Incubation is continued until the maximum amount of SAICAR is accumulated in the culture medium by checking on the SAICAR accumulated in the culture medium. The period required for the maximum accumulation of SAICAR is changeable depending on various factors such as species of adenine-requiring mutants, kinds or constitutions of nutrients of the culture medium, conditions of incubation, degrees of aeration and/or agitation, etc. However, accumulated SAICAR in the culture medium reaches the maximum usually within the fifteenth day of incubation.

For checking on the amount of SAICAR being accumulated in the medium, any per se known means of determination of SAICAR is applicable. For example, paper electrophoresis, paper partition chromatography, column chromatography on ion-exchange resins, enzymatic determination, colorimetry at the wave length of 560 millimicrons by Buchanan's method (The Journal of Biological Chemistry, volume 234, No. 7 (1959), page 1796) or measurement of absorbance at the wave length of 260 millimicrons may be utilized for the purpose. A means of microbioassay wherein a variant requiring SAICAR for its own growth as an essential factor can be applied to the same purpose.

Then the SAICAR thus accumulated in the culture medium is separated from the culture medium as a mixture of SAICAR and 5-amino-4-imidazole-N-succinocarboxamide ribotide or isolated respectively. Generally-known means for separating fermentation products or for separating similar chemical compounds are applied. For example, the difference between SAICAR and impurities in solubility or in distribution coefficient in two liquid phases or in adsorbability or in dialysability or separability from a solvent, the addition of precipitant, as well as filtration or centrifugation of the culture broth with or without addition of a filter aid, may preferably be employed. These means for separation or isolation are carried out in combination or repeatedly according to the desired purity and state of the product. SAICAR is thus obtained in a free form or in a salt form. For example, SAICAR may preferably be isolated in the form of salt formed with an inorganic or organic base such as barium salt, sodium salt, potassium salt, calcium salt, ammonium salt, amino acid salt, brucine salt, etc.

Following examples serve merely as illustrative of the preferred embodiments of this invention and do not restrict the scope of this invention. In the examples "%," "γ," "ml.," "mm." and "cm." means respectively percentages by weight, gammas, milliliters, millimeter and centimeters, "SBM" means a solution which is prepared by adding defatted soybean powder in an amount of 10% to an aqueous solution of sodium hydroxide and then boiling for 1 hour, the amount of SBM is that calculated in terms of dried defatted soybeans powder, and numbers attached to the respective names of microorganisms are accession numbers of microorganisms at American Type Culture Collection, Washington, D.C., U.S.A.

ISOLATION AND SELECTION OF THE MUTANTS USED

*Bacillus subtilis* Cohn emend Prazmowski (ATCC No. 15476) (Or *Bacillus pumilus* Gottheil (ATCC No. 15477)) is inoculated on 5 ml. of a complete medium (its components being 1% of hydrolyzates of casein, 0.5% of yeast extract, 0.5% of glucose, 0.3% of dipotassium hydrogenphosphate and 0.1% of potassium dihydrogenphosphate), and is incubated at 28° C. for 24 hours under shaking. The culture broth is washed with saline solution and is suspended in 10 ml. of a minimum medium (its components being glucose and inorganic salts). Then, ultraviolet ray (15 erg/second-mm.$^2$) is applied to the suspension for 6 minutes from 50 cm. height, followed by incubation for 16 hours in the complete medium. The cells collected are washed sufficiently with saline solution and then inoculated on culture medium which is prepared by adding amino acid, vitamin and 100 units/ml. of penicillin to the minimum medium, and subsequently is subjected to penicillin-screening for 6 hours at 37° C. Then the remaining survived cells are washed sufficiently with saline solution so as to remove penicillin completely and are plated on an agar of the complete medium. Propagating colonies are further subjected to replica-plating to the minimum medium, minimum medium containing adenine, minimum medium containing hypoxanthine and complete medium in this order, to achieve selectively the survival of adenine-requiring mutants of *Bacillus subtilis* Cohn emend Prazmowski (ATCC No. 15476) (or *Bacillus pumilus* Gottheil (ATCC No. 15477)).

*Example 1*

20 γ/ml. of adenine is added to a culture medium of pH 6.8 composed of 5% of dextrin, 1% of sodium citrate, 1% of diammonium hydrogenphosphate, 0.15% of calcium chloride, 0.05% of magnesium sulfate and 5% of SBM.

Adenine-requiring mutant of *Bacillus subtilis* Cohn emend Prazmowski (ATCC No. 15476) is inoculated on the above-mentioned culture medium and incubated at 28° C. for 9 days.

The culture filtrate is adjusted to pH 2, and then treated with active charcoal. The resultant mixture is passed through a column of anion exchange resin (acetic acid type), followed by eluting with 2.5 normal sodium acetate. 6000 γ/ml. of SAICAR and a small amount of 5-amino-4-imidazole-N-succinocarboxamide ribotide are obtained from the eluant.

*Example 2*

Adenine-requiring mutant of *Bacillus subtilis* Cohn emend Prazmowski (ATCC No. 15476) is inoculated to a culture medium of pH 6.8 composed of 0.25% of diammonium hydrogenphosphate, 0.15% of dipotassium hydrogenphosphate, 0.5% of sodium chloride, 0.01% of magnesium sulfate, 0.5% of glucose and 0.5% of meat extract, and is treated in the same way as in Example 1 to obtain 7000 γ/ml. of SAICAR.

*Example 3*

Adenine-requiring mutant of *Bacillus pumilus* Gottheil (ATCC No. 15477) is inoculated to a culture medium of pH 6.8 composed of 5% of dextrin, 1% of sodium citrate, 1% of diammonium hydrogenphosphate, 0.15% of calcium chloride, 0.05% of magnesium sulfate, 0.1% of yeast extract and 5% of SBM, and is treated in the same way as in Example 1 to obtain 4000 γ/ml. of SAICAR and 1000 γ/ml. of 5-amino-4-imidazole-N-succinocarboxamide ribotide.

Having thus disclosed this invention, what is claimed is:

1. A method for producing 5-amino-4-imidazole-N-succinocarboxamide riboside, which comprises inoculating an adenine-requiring mutant of a microorganism belonging to the genus Bacillus on a culture medium which contains adenine source in an amount to satisfy the adenine requirement of the said mutant, incubating said culture medium until said 5-amino-4-imidazole-N-succinocarboxamide riboside is accumulated in the culture medium and recovering the 5-amino-4-imidazole-N-succinocarboxamide riboside thus accumulated from the culture medium.

2. A method for producing 5-amino-4-imidazole-N-succinocarboxamide riboside, which comprises inoculating an adenine-requiring mutant of a microorganism belonging to the genus Bacillus on an aqueous culture medium containing adenine source in an amount sufficient to satisfy the adenine requirement of the said mutant, assimilable carbon source, digestible nitrogen source and other nutrient necessary for the growth of the mutant, at a temperature of 20–37° C. until 5-amino-4-imidazole-N-succinocarboxamide riboside is substantially accumulated in the culture medium, and recovering the accumulated 5-amino-4-imidazole-N-succinocarboxamide from the culture medium.

3. The method claimed in claim 2, wherein the microorganism is *Bacillus subtilis* Cohn emend Prazmowski.

4. The method claimed in claim 2, wherein the microorganism is *Bacillus pumilus* Gottheil.

5. The method claimed in claim 2, wherein the microorganism is *Bacillus subtilis* Cohn emend Prazmowski (ATCC No. 15476).

6. The method claimed in claim 2, wherein the microorganism is *Bacillus pumilus* Gottheil (ATCC No. 15477).

References Cited by the Examiner

UNITED STATES PATENTS 3,173,848  3/1965  De Zeeuw ———————— 195—28

OTHER REFERENCES

Shiro et al.: Agr. and Biol. Chem., vol. 26, No. 11, pp. 785 and 786 (1962).

A. LOUIS MONACELL, *Primary Examiner.*

ALVIN E. TANENHOLTZ, *Examinre.*